(12) United States Patent
Tanaka

(10) Patent No.: US 8,508,814 B2
(45) Date of Patent: Aug. 13, 2013

(54) IMAGE READING APPARATUS

(75) Inventor: Masahiko Tanaka, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 442 days.

(21) Appl. No.: 12/816,429

(22) Filed: Jun. 16, 2010

(65) Prior Publication Data

US 2010/0321744 A1 Dec. 23, 2010

(30) Foreign Application Priority Data

Jun. 19, 2009 (JP) ................................ 2009-147063

(51) Int. Cl.
| | |
|---|---|
| H04N 1/04 | (2006.01) |
| H04N 1/387 | (2006.01) |
| H04N 1/46 | (2006.01) |
| G06F 15/00 | (2006.01) |
| G06F 3/12 | (2006.01) |
| G06K 15/00 | (2006.01) |
| G03B 27/54 | (2006.01) |

(52) U.S. Cl.
USPC ........... 358/482; 358/474; 358/475; 358/450; 358/514; 358/1.9; 358/1.13; 358/1.15; 358/1.16; 355/70

(58) Field of Classification Search
USPC ................ 358/1.15, 1.13, 474, 482, 475, 1.1; 348/207.2
See application file for complete search history.

(56) References Cited

U.S. PATENT DOCUMENTS

| 8,081,355 B2 * | 12/2011 | Nishina et al. ................. 358/474 |
| 2008/0218724 A1 * | 9/2008 | Nishina et al. .................. 355/70 |

FOREIGN PATENT DOCUMENTS

| JP | 03-165661 A | 7/1991 |
|---|---|---|
| JP | 07-193685 A | 7/1995 |
| JP | 2004-170858 A | 6/2004 |
| JP | 2005-027082 A | 1/2005 |
| JP | 2005-102112 A | 4/2005 |
| JP | 2008-172562 A | 7/2008 |
| JP | 2008-177918 | 7/2008 |
| JP | 2008-219511 A | 9/2008 |

OTHER PUBLICATIONS

Office Action (Notification of Reasons for Refusal) dated Nov. 15, 2011, issued in the corresponding Japanese Patent Application No. 2009-147063, and an English Translation thereof.

* cited by examiner

*Primary Examiner* — Charlotte M Baker
*Assistant Examiner* — Rury Grisham
(74) *Attorney, Agent, or Firm* — Buchanan Ingersoll & Rooney PC

(57) ABSTRACT

An image reading apparatus for reading an image of a document optically by illuminating a document with light emitted from a plurality of light emitting elements arranged linearly and by reading light reflected from the document. The image reading apparatus has a first light emitting element for emitting light in a first direction, a second light emitting element for emitting light in a second direction and one substrate for supporting the first light emitting element and the second light emitting element thereon.

12 Claims, 5 Drawing Sheets

F I G. 1
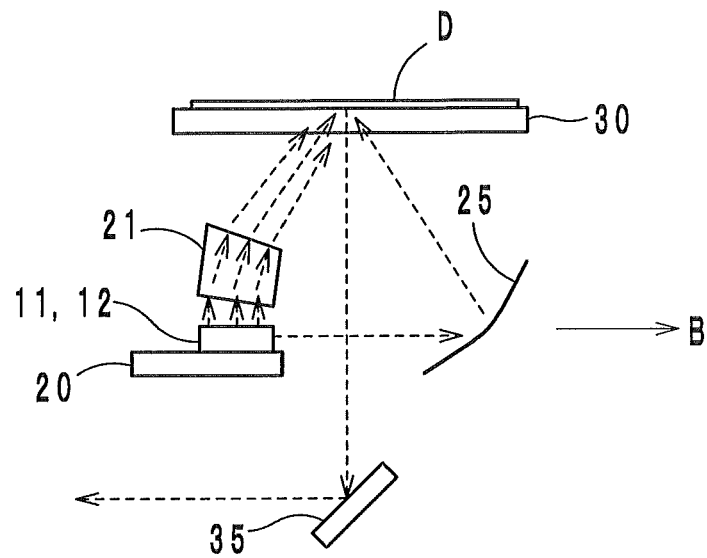
F I G. 2
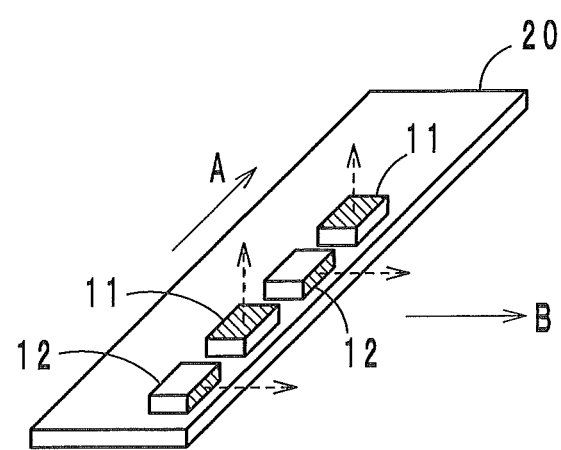

IMAGE READING APPARATUS

This application is based on Japanese Patent Application No. 2009-147063 filed on Jun. 19, 2009, of which content is incorporated herein by reference.

BACKGROUND OF THE INVENTION

1. Field of the Invention

The present invention relates to an image reading apparatus, and more particularly to an image reading apparatus that optically reads an image by reading reflected light from a document.

2. Description of Related Art

In an image reading apparatus, which is called a scanner, either a reading system comprising a linear light source or an object of image reading such as a document is moved in a direction perpendicular to the linear direction of the light source, so that an image is read two-dimensionally. As the light source, conventionally, a fluorescent lamp is used, but in these years, it is tried to use an LED.

Unlike a fluorescent lamp, an LED is a point light source. Therefore, in order to obtain linear light distribution, which is required for scanning, the light emitted from an LED must be changed to have linear light distribution by use of a light guide member, or a plurality of LEDs must be arranged linearly on a substrate.

Also, an image reading apparatus is demanded to read an image in a cubic area without shading, and for this purpose, it is necessary to illuminate an object of image reading from both sides of scanning. In a conventional lighting system using a fluorescent lamp, it is avoided to use two fluorescent lamps, which is costly, to illuminate an object from both sides, and in order to cut the cost, only one fluorescent lamp and a reflection mirror that are located opposite each other are provided. However, an LED has strong directivity and unlike a fluorescent lamp, cannot be used keeping a large angle of aperture, and when an LED is used as the light source, it is difficult to illuminate an object from both sides of a scanning direction.

Japanese Patent Laid-Open Publication No. 2004-170858 suggests that LEDs be disposed at both sides of a scanning direction to illuminate an object of image reading from both sides. Japanese Patent Laid-Open Publication No. 2005-102112 suggests that a convergent member be provided between an LED and an object of image reading and that part of light traveling toward the object be reflected by reflection mirrors located opposite each other to illuminate the object from the other side.

In the former structure, LEDs are provided at both sides, and a large substrate and complicated wiring are necessary, which inevitably results in an increase in cost. In the latter structure, light is diverged at the convergent member, which causes a large amount of diffused light and lowers the efficiency of using light. Also, stray light occurs, which results in degradation of image reading performance.

SUMMARY OF THE INVENTION

According to an aspect of the present invention, an image reading apparatus comprises: a first light emitting element for emitting light in a first direction; a second light emitting element for emitting light in a second direction; one substrate for supporting the first light emitting element and the second light emitting element thereon; and an image reader for reading light emitted from the first light emitting element and the second light emitting element and reflected from an object of image reading.

BRIEF DESCRIPTION OF THE DRAWINGS

This and other features of the present invention will be apparent from the following description with reference to the accompanying drawings, in which:

FIG. 1 is a schematic view of a main part of an image reading apparatus according to a first embodiment of the present invention;

FIG. 2 is a perspective view of a light source unit according to the first embodiment;

DETAILED DESCRIPTION OF THE PREFERRED EMBODIMENTS

Figure 3:
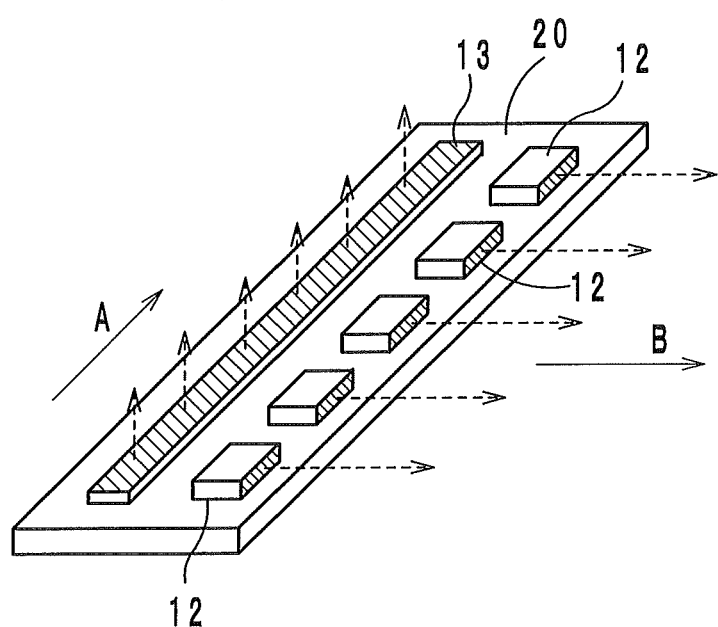
FIG. 3 is a perspective view of a light source unit of an image reading apparatus according to a second embodiment of the present invention.

Image reading apparatuses according to the preferred embodiments of the present invention will be described with reference to the accompanying drawings. In the drawings, the same parts and members are provided with the same reference symbols, and repetitions of the descriptions thereof are omitted.

First Embodiment

See FIGS. 1 and 2

As shown by FIGS. 1 and 2, in an image reading apparatus according to a first embodiment, a plurality of first type of LEDs (light emitting diodes) 11 and a plurality of second type of LEDs 12 are arranged in one direction "A" on an upper surface of a substrate 20. The first type of LEDs 11 emit light from their respective top surfaces (top-view type), and the second type of LEDs 12 emit light from their respective side surfaces (side-view type). The first type of LEDs 11 and the second type of LEDs 12 are arranged alternately on the substrate 20. In FIG. 2, the light emitting surfaces of the LEDs 11 and 12 are hatched, and likewise, in other drawings showing other embodiments, light emitting surfaces of LEDs are hatched.

A light guide 21 that has a light convergent function is provided immediately above the line of LEDs 11 and 12, and light emitted from the first type of LEDs 11 is converged and deflected by the light guide 21 to illuminate a document D placed on a platen glass 30 from left lower side in FIG. 1. A reflection plate 25 is disposed opposite the light emitting surfaces of the second type of LEDs 12, and light emitted from the second type of LEDs 12 is reflected by the reflection plate 25 to illuminate the document D from right lower side in FIG. 1.

The substrate 20 is disposed in parallel to the platen glass 30, and the dimension of the substrate 20 in the direction "A" in which the LEDs are aligned is long enough to cover the width of the document D. The number of LEDs 11 and 12 is large enough to provide a light quantity required for optically reading a document image. The light emitted from the LEDs 11 and 12 and then reflected by the document D is reflected by a mirror 35 and taken into an image pick-up device, such as a CCD (not shown), via another mirror (not shown) and an imaging lens (not shown). Thus, the light is processed into image data. During the image reading operation, the lighting system, including the LEDs 11 and 12, moves in a direction of "B" at a specified speed.

In the first embodiment, the first type of LEDs 11 and the second type of LEDs 12 emit light in different directions, and the document D can be illuminated efficiently from both sides with the light emitted from the LEDs 11 and 12. Even if the document D is uneven, image reading without shading is possible. Further, since the first type of LEDs 11 and the second type of LEDs 12 are disposed on a single substrate 20, wiring is simple, and the cost is low. Additionally, by using a light guide 21 having a convergent function, it is possible to converge light emitted from the first type of LEDs 11 into a desired position, and thereby, the efficiency of using light is high.

Also, since the LEDs 11 and 12 are point light sources, it is likely that light quantity unevenness occurs in the arranging direction (direction "A"). In the first embodiment, however, since the reflection plate 25 is provided, the distance between the LEDs 12 and the document D becomes longer, and light quantity unevenness in the direction "A" is suppressed due to divergence of light. The alternate arrangement of the first type of LEDs 11 and the second type of LEDs in the direction "A" helps suppressing the light quantity unevenness in the direction "A" and permits the light quantities in both sides to be balanced with each other.

Further, it is possible to freely set the ratio of illumination of the document D from the right side to that from the left side by changing the ratio of the number of first type of LEDs 11 to the number of second type of LEDs 12 from 1:1 to any desired ratio.

Second Embodiment

See FIG. 3

As shown by FIG. 3, an image reading apparatus according to a second embodiment comprises a top-view type organic EL (electroluminescence) element 13 and a plurality of side-view type LEDs 12. On a single substrate 20, the top-view type organic EL element 13 is disposed to extend in a direction "A", and the plurality of side-view type LEDs 12 are aligned in the direction "A" at specified intervals. The structure of the second embodiment is the same as that of the first embodiment, except that the organic EL element 13 is used in the second embodiment instead of the first type of LEDs 11 in the first embodiment. The advantages of the second embodiment are the same as those of the first embodiment.

Third Embodiment

Figure 4:
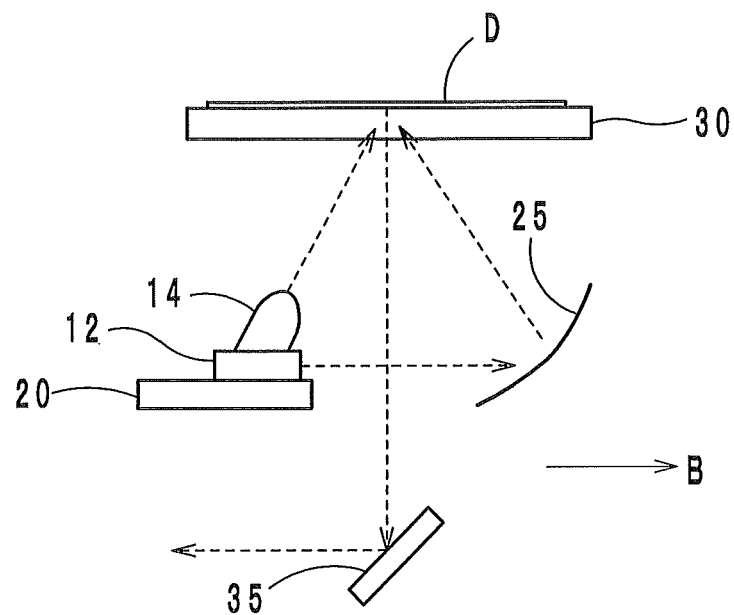
FIG. 4 is a schematic view of a main part of an image reading apparatus according to a third embodiment of the present invention.
Figure 5:
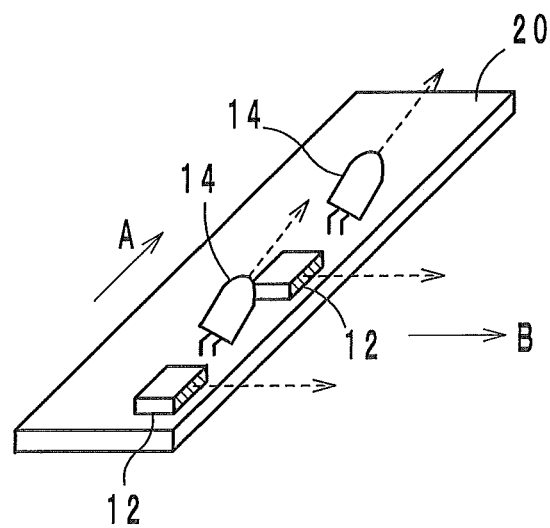
FIG. 5 is a perspective view of a light source unit according to the third embodiment.

See FIGS. 4 and 5

As shown by FIGS. 4 and 5, an image reading apparatus according to a third embodiment comprises a plurality of bullet type LEDs 14 and a plurality of side-view type LEDs 12. The bullet type LEDs 14 and the side-view type LEDs 12 are aligned in a direction "A" alternately at specified intervals. The structure of the third embodiment is the same as that of the first embodiment, except that the LEDs 14 are used in the third embodiment instead of the LEDs 11 in the first embodiment. The advantages of the third embodiment are the same as those of the first embodiment. Further, in the third embodiment, the usage of the bullet type LEDs 14 eliminates the necessity of using the light guide 21, which is used in the first embodiment, and permits direct illumination from the LEDs 14 to the document D.

Fourth Embodiment

Figure 6:
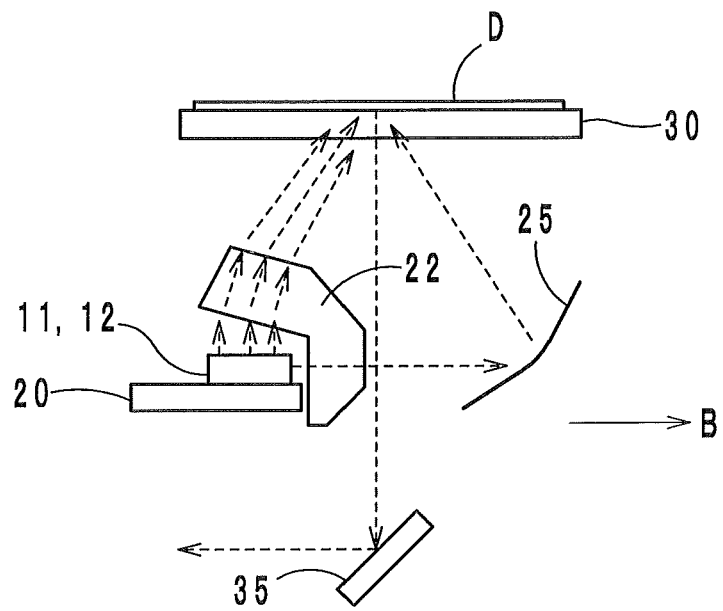
FIG. 6 is a schematic view of a main part of an image reading apparatus according to a fourth embodiment of the present invention.

See FIG. 6

As shown by FIG. 6, in an image reading apparatus according to a fourth embodiment, an L-shaped light guide 22 is disposed near the first type of LEDs 11 and the second type of LEDs 12 so as to converge not only light emitted from the first type of LEDs 11 but also light emitted from the second type of LEDs 12. The other parts of the fourth embodiment are the same as those of the first embodiment, and the advantages of the fourth embodiment are the same as those of the first embodiment.

First Modification with Respect to Light Source Arrangement

Figure 7:
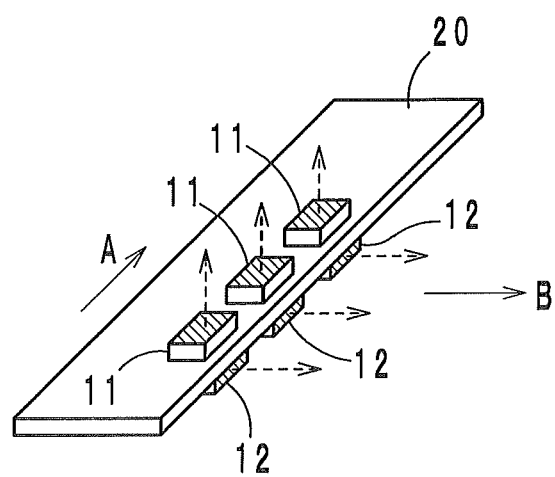
FIG. 7 is a perspective view of a first modification with respect to the arrangement of light sources.

See FIG. 7

According to a first modification with respect to the arrangement of light sources, as shown by FIG. 7, the first type of LEDs 11 are disposed on an upper surface of the substrate 20, and the second type of LEDs 12 are disposed on a lower surface of the substrate 20. Thereby, it is possible to heighten the mounting density of the LEDs 11 and 12.

In an image reading apparatus, a larger quantity of light is required for high-speed image reading because the exposure time per line is shorter at a time of scanning an image at a higher speed. At that time, if the light quantity is not enough, shot noise increases, which results in degradation of picture quality. Therefore, it is desired to increase the exposure value for high-speed scanning. In the first modification, the first type of LEDs 11 and the second type of LEDs 12 are disposed separately on the upper surface and on the lower surface of the substrate 20, and therefore, it is possible to increase the exposure value of the document by heightening the mounting density of the LEDs 11 and 12.

Second Modification with Respect to Light Source Arrangement

Figure 8:
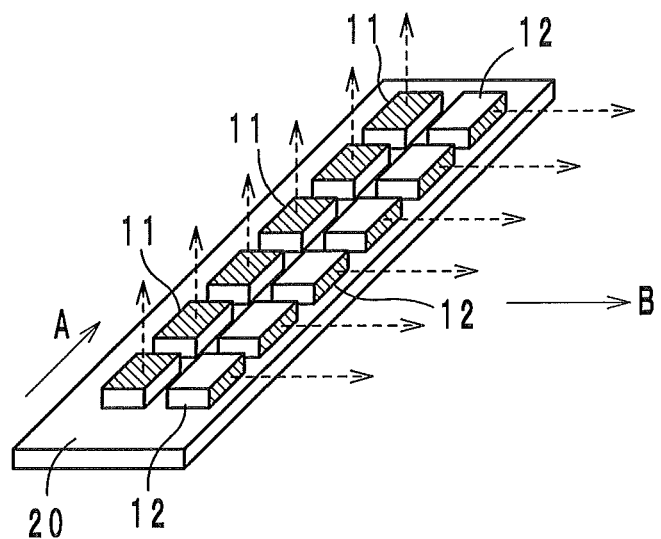
FIG. 8 is a perspective view of a second modification with respect to the arrangement of light sources.

See FIG. 8

According to a second modification with respect to the arrangement of light sources, as shown by FIG. 8, the first type of LEDs 11 and the second type of LEDs 12 are arranged parallel to each other on a surface (an upper surface) of the substrate 20. With this arrangement also, it is possible to increase the exposure value of the document by heightening the mounting density of the LEDs 11 and 12.

Third Modification with Respect to Light Source Arrangement

Figure 9:
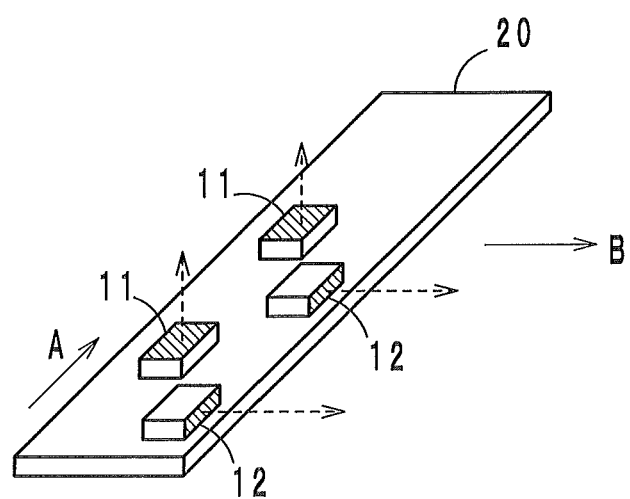
FIG. 9 is a perspective view of a third modification with respect to the arrangement of light sources.

See FIG. 9

According to a third modification with respect to the arrangement of light sources, as shown by FIG. 9, the first type of LEDs 11 and the second type of LEDs 12 are arranged in a zigzag on a surface (an upper surface) of the substrate 20. Thereby, contrary to the first modification and the second modification, it is possible to lower the mounting density of the LEDs 11 and 12. By arranging the LEDs 11 and 12 in a zigzag, it is possible to heighten the efficiency of heat radiation, thereby suppressing a rise in temperature.

Other Embodiments

The image reading apparatuses according to the embodiments above have low-cost simple structures that permit an object of image reading to be illuminated efficiently from both sides.

In the structures, the object of image reading is illuminated with light emitted from the first light emitting element and with light emitted from the second light emitting element in different directions. Thereby, the object of image reading can be illuminated from both sides efficiently, and it is possible to perform image reading of even a cubic area without shading. Additionally, since the first light emitting element and the second light emitting element are disposed on a single substrate, the wiring is simple, and it does not cost much.

The shapes and the positions of the reflection member, the convergent member and the light guide may be arbitrarily designed. Image reading may be performed while a document is being fed at a specified speed with the image reading apparatus and the platen glass fixed.

Although the present invention has been described in connection with the preferred embodiments above, it is to be noted that various changes and modifications are possible to those who are skilled in the art. Such changes and modifications are to be understood as being within the scope of the invention.

What is claimed is:

1. An image reading apparatus comprising:
a first light emitting element for emitting light in a first direction;
a second light emitting element for emitting light in a second direction;
one substrate for supporting the first light emitting element and the second light emitting element thereon; and
an image reader for reading light emitted from the first light emitting element and the second light emitting element and reflected from an object of image reading;
wherein one of the first light emitting element and the second light emitting element illuminates the object of image reading directly; and
wherein the other of the first light emitting element and the second light emitting element illuminates the object of image reading via a reflection member.

2. An image reading apparatus according to claim 1, wherein the first light emitting element and the second light emitting element are LEDs.

3. An image reading apparatus according to claim 1, wherein the first light emitting element and the second light emitting element are disposed parallel to each other on a surface of the substrate.

4. An image reading apparatus according to claim 1, comprising:
a first light emitting element for emitting light in a first direction;
a second light emitting element for emitting light in a second direction;
one substrate for supporting the first light emitting element and the second light emitting element thereon; and
an image reader for reading light emitted from the first light emitting element and the second light emitting element and reflected from an object of image reading;
wherein either the first light emitting element or the second light emitting element is an organic electroluminescence element.

5. An image reading apparatus according to claim 1, further comprising a convergent member that is disposed between one of the first light emitting element and the second light emitting element and the object of image reading or between the reflection member and the object of image reading.

6. An image reading apparatus according to claim 4, wherein the first light emitting element and the second light emitting element are disposed parallel to each other on a surface of the substrate.

7. An image reading apparatus comprising:
a first light emitting element for emitting light in a first direction;
a second light emitting element for emitting light in a second direction;
one substrate for supporting the first light emitting element and the second light emitting element thereon; and
an image reader for reading light emitted from the first light emitting element and the second light emitting element and reflected from an object of image reading;
wherein one of the first light emitting element and the second light emitting element is disposed on a first surface of the substrate; and
wherein the other of the first light emitting element and the second light emitting element is disposed on a second surface, which is a reverse surface of the first surface, of the substrate.

8. An image reading apparatus according to claim 7, wherein the first light emitting element and the second light emitting element are LEDs.

9. An image reading apparatus comprising:
a first light emitting element for emitting light in a first direction;
a second light emitting element for emitting light in a second direction;
one substrate for supporting the first light emitting element and the second light emitting element thereon; and
an image reader for reading light emitted from the first light emitting element and the second light emitting element and reflected from an object of image reading;
wherein the first light emitting element is a plural in number;
wherein the second light emitting element is a plural in number; and
wherein the plurality of first light emitting elements and the plurality of second light emitting elements are arranged in a zigzag.

10. An image reading apparatus according to claim 9, wherein the first light emitting element and the second light emitting element are LEDs.

11. An image reading apparatus comprising:
- a first light emitting element for emitting light in a first direction;
- a second light emitting element for emitting light in a second direction;
- one substrate for supporting the first light emitting element and the second light emitting element thereon; and
- an image reader for reading light emitted from the first light emitting element and the second light emitting element and reflected from an object of image reading;
- wherein the first light emitting element is a plural in number;
- wherein the second light emitting element is a plural in number; and
- wherein the plurality of first light emitting elements and the plurality of second light emitting elements are aligned alternately.

12. An image reading apparatus according to claim 11, wherein the first light emitting element and the second light emitting element are LEDs.

* * * * *